United States Patent
Keys, II et al.

(10) Patent No.: US 9,050,978 B2
(45) Date of Patent: Jun. 9, 2015

(54) SLIP-RESPONSIVE VEHICLE DRIVE SYSTEM

(71) Applicant: DEERE & COMPANY, Moline, IL (US)

(72) Inventors: Gary S. Keys, II, Cedar Falls, IA (US); Christopher D. Turner, Waterloo, IA (US); Joe L. Schutte, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 52 days.

(21) Appl. No.: 14/066,134

(22) Filed: Oct. 29, 2013

(65) Prior Publication Data

US 2015/0120103 A1    Apr. 30, 2015

(51) Int. Cl.
*B60W 20/00* (2006.01)
*B60W 30/18* (2012.01)
*B60K 6/442* (2007.10)

(52) U.S. Cl.
CPC .......... *B60W 30/18172* (2013.01); *B60K 6/442* (2013.01); *B60W 20/40* (2013.01); *B60W 30/18009* (2013.01)

(58) Field of Classification Search
CPC ............. B60W 2520/26; B60W 20/00; B60K 23/0808; B62D 59/04
USPC .......................................................... 701/22
See application file for complete search history.

(56) References Cited

U.S. PATENT DOCUMENTS

2012/0116641 A1 *   5/2012   Crosman et al. ................ 701/84

* cited by examiner

*Primary Examiner* — Mary Cheung
*Assistant Examiner* — Yuen Wong

(57) ABSTRACT

A drive and control system is provided for a towing vehicle pulling a towed implement, such as a tractor pulling a scraper. The drive system includes an engine which drives a generator for generating electric power. A towing vehicle electric drive motor is connected to driven wheels of the towing vehicle through a transmission. An assist or implement electric drive motor is drivingly connected to driven wheels of the implement. A power distribution unit controls distribution of electric power from the generator to the towing vehicle and implement drive motors. A control unit controls the power distribution unit as a function of an operator set power split, an operator set maximum wheel slip, sensed wheel slip and other sensed parameters.

9 Claims, 3 Drawing Sheets

SLIP-RESPONSIVE VEHICLE DRIVE SYSTEM

FIELD OF THE INVENTION

The present disclosure relates to a drive and control system for a vehicle pulling a powered implement, which is responsive to wheel slip.

BACKGROUND OF THE INVENTION

A tractor pulling a scraper is an example of a towing vehicle pulling a towed implement. Earth moving scrapers are heavy and often operate in soil conditions where getting power to the ground can be a challenge. The weight carried by the scraper tires provides the potential for developing tractive effort which assists the towing vehicle propel the scraper. If this additional tractive effort can be utilized, the drawbar pull needed from the tractor while loading the scraper and climbing steep grades will be reduced. The operational performance advantage by employing a traction axle on the scraper linked to a traction control system can be substantial. First, the system will develop additional traction for the overall system which will lead to faster pan fills and moving more material in less time. Secondly, the load on many tractor drivetrain components including the drive axles and tires will be reduced, thus extending the service life and reducing overall operating expenses. Thirdly, this reduction in the maximum drawbar load allows ballast to be removed from the tractor and lowers the parasitic losses due to the rolling resistance of the entire tractor-scraper system. This will allow for higher transport speeds and a more productive operation while improving fuel economy during the entire operating cycle (loading, transport and unloading). Lastly, the system will increase the equipment's utilization by allowing operations in conditions where a normal tractor-scraper system would become stuck.

SUMMARY

According to an aspect of the present disclosure, a traction drive control system is provided for a towing vehicle pulling a towed implement, such as a tractor pulling a scraper. The drive system includes a diesel engine which drives a generator for generating electrical power. A tractor axle drive motor is drivingly connected to driven wheels of the tractor. A second assist drive motor is drivingly connected to driven wheels of the towed implement. A power management unit controls distribution of electric power from the generator to the tractor drive motor and to the assist drive motor on the implement. The power management unit controls the power distribution unit as a function of tractor wheel slip. If the tractor wheel slip exceeds a preset value, the tractor axle drive motor becomes a second generator which produces additional power that is sent to the assist drive motor on the implement. With this system, more power can be delivered to ground while minimizing tractor wheel slip.

DETAILED DESCRIPTION OF THE DRAWINGS

Figure 1:
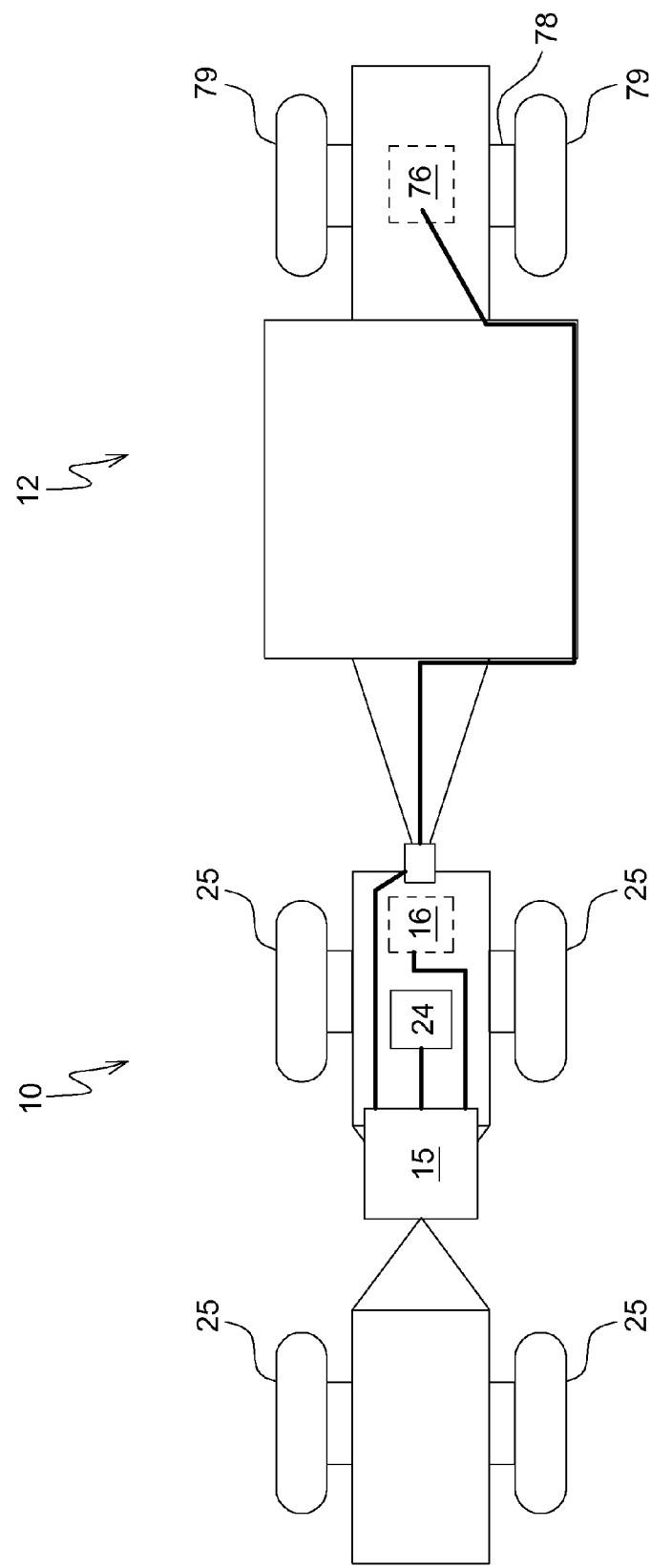
FIG. 1 is a simplified schematic diagram of a drive system embodying the invention.
Figure 2:
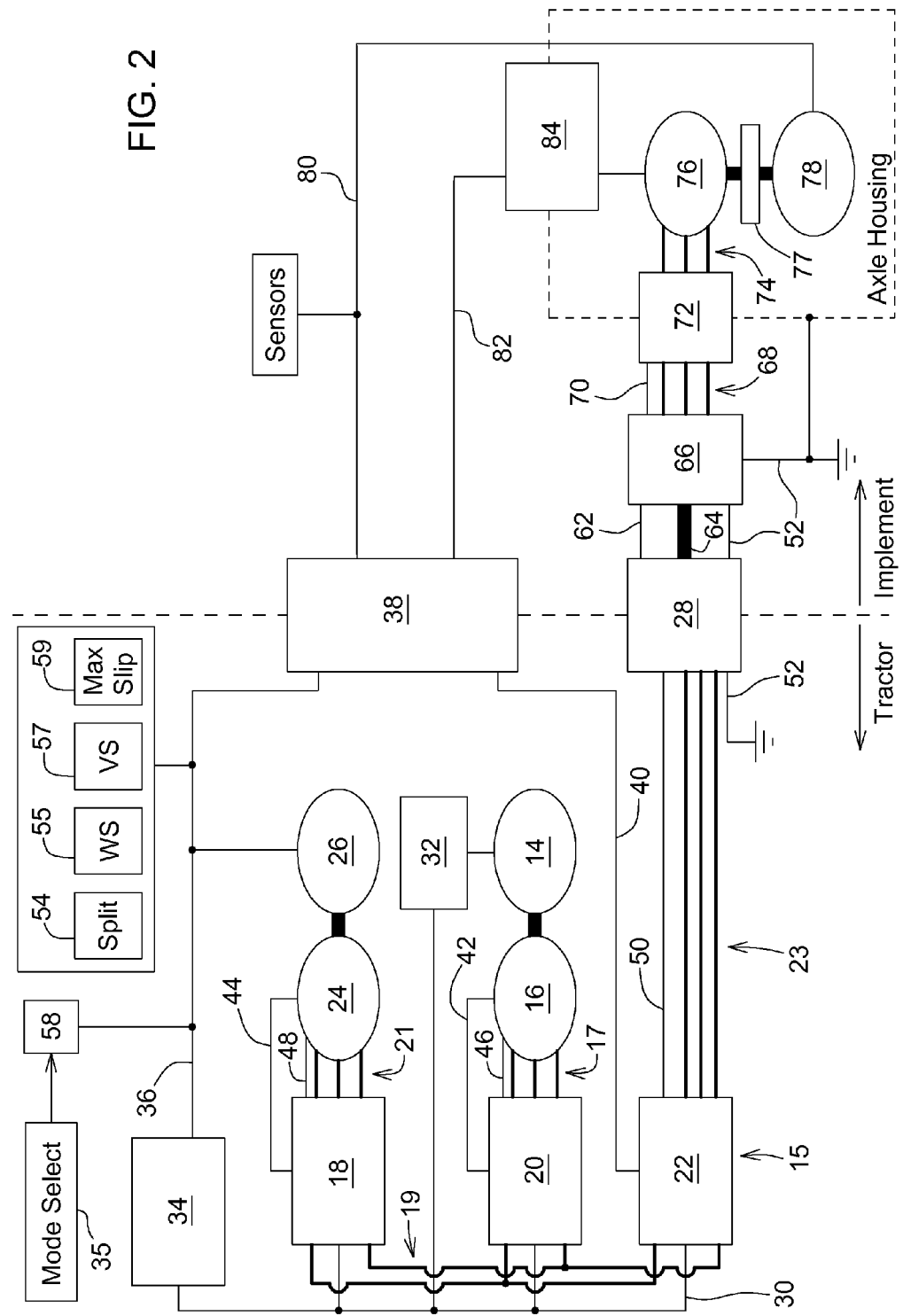
FIG. 2 is a simplified schematic electrical diagram of the drive system of FIG. 1.

Referring to FIGS. 1 and 2, a drive system is provided for a towing vehicle or tractor 10 which pulls an implement 12. The towing vehicle 10 may be an agricultural tractor. The towed implement 12 may be a pull-type scraper. The tractor 10 includes an engine 14, such as a Diesel engine, which drives the tractor axles as well as an electric generator 16. The generator 16 provides electrical power to power electronics units 15. The power electronics units 15 distribute electrical power to traction motor units 24 and 76 which drive corresponding vehicle wheels 25 and 79. Alternatively, the tractor 10 may have an engine which drives a generator that powers electric wheel motors (not shown) which provide power to driven wheels of the tractor. Alternatively, instead of a diesel engine driving a generator, the tractor 10 may have a known fuel cell (not shown) and power electronics for generating electrical power. Thus, this would require a tractor 10 with some type of electric drive train. This would normally be a Diesel electric system somewhat similar to a locomotive. The prime mover could be any type of combustion engine or fuel cell of adequate capacity, and the electric power would normally be used to power the drive axles of the tractor 10. Alternatively, the tractor 10 may have dual engines (not shown).

The towed implement 12 includes an electric assist or implement traction drive motor 76 which receives electrical power from the power electronics unit 15. The assist motor 76 drives an axle 78 which drives wheels 79 of the towed implement 12.

Referring to FIG. 2, the electrical generator 16 is coupled by 3-phase wiring 17 to a power electronics unit 15 which includes electrical power inverters 18, 20 and 22. Inverter 18 is coupled by a DC bus 19 to inverter 20 and inverter 22. Inverter 20 is operatively coupled by 3-phase wiring 21 to a traction motor 24 which is drivingly coupled to a transmission 26, such as a 2-speed transmission which is drivingly coupled to driven wheels 25 of the towing vehicle 10. Inverter 22 is coupled by 3-phase wiring 23 to a 3-phase connector 28 which electrically connects the power electronics of the towing vehicle 10 to the implement traction motor of the towed implement 12.

Control wiring 30 connects inverters 18-22 to each other, to a transmission controller 34, and to the power management unit 58. An operator controlled mode select unit 35 is connected to the power management unit 58. Using mode select unit 35, the operator can select either a maximum wheel slip mode or a traction mode. Control wiring 36 connects transmission controller 34 to the 2-speed transmission 26 and to a control connector 38 which electrically connects the control electronics of the towing vehicle 10 to the control electronics of the towed implement 12. Control wiring 40 connects inverter 22 to the control connector 38. Control wiring 42 connects inverter 20 to generator 16. Control wiring 44 connects inverter 18 to the traction motor 24.

An interlock wiring 46 connects inverter 20 to generator 16. An interlock wiring 48 connects inverter 18 to motor 24. An interlock wiring 50 connects inverter 22 to connector 28. Ground wiring 52 connects the 3-phase connector 28 to equipotential ground points. The power management unit (PMU) 58 obtains the engine load factor from the engine control unit 32, the power split from the operator controlled power split setting unit 54, wheel speed from wheel speed sensor 55 and vehicle speed from the vehicle speed sensor 57. The PMU also obtains a maximum desired wheel slip from a wheel slip setting unit 59.

Referring now to the towed implement portion of FIG. 2, the 3-phase connector 28 is connected by ground wiring 52, by interlock wiring 62 and by 3-phase AC wiring 64 to an interface box 66. Interface box 66 is connected by a 3-phase AC wiring 68 and by interlock wiring 70 to a high current connector 72. The connector 72 is connected by 3-phase AC wiring 74 to the towed implement traction motor 76, which is drivingly connected to the driven axle 78 of the towed implement 12.

A one-way clutch 77 is coupled between the traction motor 76 and the driven axle 78. Because the towed implement axle 78 has such a high drive ratio, once the vehicle reaches higher speeds (such as 11 mph for example), the towed implement axle 78 must be disengaged from the electric motor 76 to prevent motor damage by over speeding. The one-way clutch 76 is used to accomplish this and will disengage the electric motor 76 from the towed implement axle 78 automatically.

Control connector 38 is connected by control lines 80 and 82 and connector 84 to the traction motor 76 and to the towed implement axle 78. The control connector 38 is also connected by control line 80 to towed implement and vehicle sensors which sense parameters such as electric motor temperatures, electric motor/generator speeds, implement wheel speeds, implement wheel slip (uses radar/gps and axle speeds to calculate) and ground speed.

Figure 3:
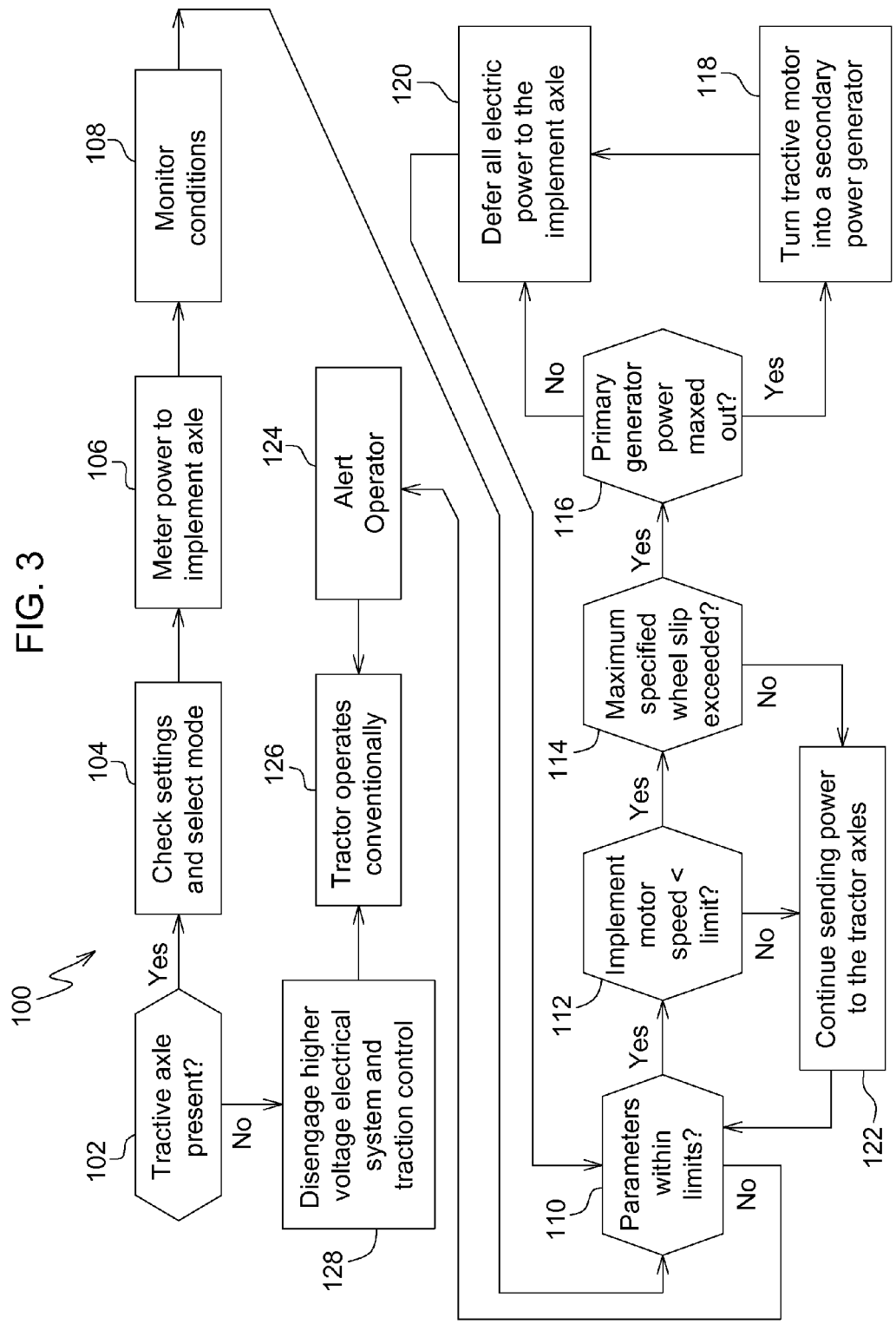
FIG. 3 is a flow chart of an algorithm performed by the power management unit of FIG. 2.

The power management unit 58 executes an algorithm 100 represented by FIG. 3. The conversion of this flow chart into a standard language for implementing the algorithm described by the flow chart in a digital computer or microprocessor, will be evident to one with ordinary skill in the art.

In step 102 the PMU 58 determines if an implement with an electric assist drive motor is present. If yes, the PMU executes step 104, else to step 128.

In step 104, the PMU 58 obtains the mode select decision from the mode select unit 35. The PMU 58 obtains either a maximum desired tractor wheel slip set by the operator, or a pre-defined traction mode that is chosen by the operator based on field conditions. For example, the pre-defined tractor modes will set the maximum allowable slip and may include settings for slippery, firm, loose, or sandy soil conditions.

Then step 106, based on the chosen mode, distributes power to the implement in an effort to meet the maximum tractor wheel slip value.

Step 108 monitors main engine load, ground speed, wheel speeds and torques, electric motor and inverter temperatures, voltages and currents.

Step 110 directs control to step 112 if all system parameters are within specified limits, else step 110 directs control to step 124.

If the implement motor speed is less than a pre-defined limit, then step 112 directs control to step 114, else to step 122.

If the maximum tractor wheel slip has been exceeded, then step 114 directs control to step 116, else to step 122.

If the power from the primary generator 16 is operating at maximum capacity, then step 116 directs control to step 118, else to step 120.

In step 118, the PMU operates so that excess tractor wheel slip is used to turn the traction motor 24 into a secondary generator which provides additional electric power to the implement traction assist motor 76.

Step 120 defers all available electric power from the tractor to the implement motor 76, to improve traction. The step 120 returns control to step 110.

Step 122 continues sending electric power from the primary generator 16 to the tractor traction motor 24, then directs control back to step 110.

Step 124 generates alerts the operator that a system parameter is outside of its limits.

Step 126 causes the tractor 10 to operate without any electric power being sent to the tractor or implement traction motors.

Step 128 disengages the high voltage electrical system and disengages the traction motor control system, then directs control to step 126.

This system provides better traction, leading to faster pan fills and more material moved in less time, if the towed implement is a scraper. There is also reduced wear on the tractor tires and drivetrain due to less wheel slip and reduced drawbar load. Furthermore, in less than ideal ground conditions the operator will have increased equipment utilization because the equipment can be operated in conditions when conventional equipment cannot be operated. This system could be used with implements other than scrapers, such as any large pull type implement (grain cart, slurry tanks, air seeder carts, etc.) where productivity and/or efficiency is improved with additional traction.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A drive system for a towing vehicle pulling a towed powered implement, the drive system comprising:
    a power generating unit, including a generator for generating electrical power;
    an implement electric drive motor connected to a driven axle of the towed implement;
    a manually operable power distribution setting unit;
    a vehicle speed sensor for generating a vehicle speed signal;
    a wheel speed sensor for generating a wheel speed signal;
    a power distribution unit for controlling distribution of electric power from the generator to the implement electric drive motor; and
    a control unit connected to the setting unit, the speed sensors and the power distribution unit, the control unit determining wheel slip from the vehicle and wheel speed sensors, and the control unit controlling the power distribution unit in response to the setting unit and the wheel slip.

2. The drive system of claim 1, wherein:
    the drive system also comprises a vehicle electric drive motor connected to driven wheels of the towing vehicle; and
    if a maximum wheel slip is exceeded and generator power is at maximum capacity, then the control unit causes the vehicle electric drive motor to operate as a secondary generator and to deliver power to the implement electric drive motor.

3. The drive system of claim 2, wherein:
    if a maximum wheel slip is exceeded and generator power is not at maximum capacity, then the control unit causes the generator to deliver additional electric power to the implement electric drive motor.

4. The drive system of claim 1, wherein:
the drive system also comprises a vehicle electric drive motor connected to a driven wheel of the towing vehicle; and
if a maximum wheel slip is exceeded and generator power is at a maximum, then the control unit causes the vehicle electric drive motor to operate as a secondary generator, and the control unit causes all available electric power to be delivered to the implement electric drive motor.

5. The drive system of claim 1, further comprising:
an operator-controlled maximum towing vehicle wheel slip setting unit.

6. The drive system of claim 5, wherein:
the control unit causes electric power to be distributed to the implement electric drive motor to maintain towing vehicle wheel slip less than a maximum value set by the operator.

7. A drive system for a towing vehicle pulling a towed powered implement, the drive system comprising:
a power generating unit, including a generator for generating electrical power;
a vehicle electric drive motor connected to a driven wheel of the towing vehicle;
an implement electric drive motor connected to a driven axle of the towed implement;
a manually operable power distribution setting unit;
a vehicle speed sensor for generating a vehicle speed signal;
a wheel speed sensor for generating a wheel speed signal;
a power distribution unit for controlling distribution of electric power from the generator to both the vehicle motor and the implement electric drive motor and for controlling distribution of electric power between the vehicle motor and the implement electric drive motor; and
a control unit connected to the setting unit, the speed sensors and the power distribution unit, the control unit determining wheel slip from the vehicle and wheel speed sensors, and the control unit controlling the power distribution unit in response to the setting unit and the wheel slip.

8. The drive system of claim 7, further comprising:
an operator-controlled maximum towing vehicle wheel slip setting unit; and the control unit causes electric power to be distributed to the vehicle motor and implement electric drive motor to maintain towing vehicle wheel slip less than maximum value set by the operator.

9. The drive system of claim 7, wherein:
if a maximum wheel slip is exceeded, generator power is at a maximum, and a transmission of the towing vehicle has unused capacity, then the control unit causes the vehicle electric drive motor to operate as a secondary generator, and the control unit causes all available electric power to be delivered to the implement electric drive motor.

* * * * *